United States Patent
Ma et al.

(10) Patent No.: US 12,279,064 B2
(45) Date of Patent: Apr. 15, 2025

(54) IMAGE COMPENSATION CIRCUIT FOR GAMMA CALIBRATION

(71) Applicant: NOVATEK Microelectronics Corp., Hsin-Chu (TW)

(72) Inventors: Wei-Jhe Ma, Taichung (TW); Feng-Ting Pai, Hsinchu (TW); Jun-Yu Yang, Hsinchu (TW); Hsin-Yu Pan, Hsinchu County (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 176 days.

(21) Appl. No.: 18/113,059

(22) Filed: Feb. 23, 2023

(65) Prior Publication Data
US 2023/0300284 A1 Sep. 21, 2023

Related U.S. Application Data

(60) Provisional application No. 63/321,077, filed on Mar. 17, 2022.

(51) Int. Cl.
| | |
|---|---|
| *H04N 5/202* | (2023.01) |
| *G06V 10/74* | (2022.01) |
| *G09G 3/3208* | (2016.01) |
| *H04N 9/69* | (2023.01) |

(52) U.S. Cl.
CPC .......... *H04N 5/202* (2013.01); *G06V 10/761* (2022.01); *G09G 3/3208* (2013.01); *H04N 9/69* (2013.01); *G09G 2320/0276* (2013.01); *G09G 2320/0673* (2013.01)

(58) Field of Classification Search
CPC ........ G06V 10/761; H04N 9/69; H04N 5/202; G09G 3/20; G09G 3/3208; G09G 2320/0223; G09G 2320/0276; G09G 2320/0673; G09G 2320/0233; G09G 2360/16
USPC .......................................... 348/254
See application file for complete search history.

(56) References Cited

U.S. PATENT DOCUMENTS

| | | | | |
|---|---|---|---|---|
| 10,818,210 B2* | 10/2020 | Ma | ............. | G09G 3/20 |
| 11,158,245 B2* | 10/2021 | Yum | ............. | G09G 3/3283 |
| 11,170,687 B2* | 11/2021 | Heo | ............. | G09G 3/006 |
| 11,244,610 B2* | 2/2022 | Li | ............. | G09G 3/3233 |
| 11,295,674 B2* | 4/2022 | Yang | ............. | G09G 3/3258 |
| 11,462,164 B1* | 10/2022 | Orio | ............. | G09G 3/325 |

(Continued)

FOREIGN PATENT DOCUMENTS

| | | |
|---|---|---|
| CN | 106652874 B | 2/2020 |
| TW | 202137747 A | 10/2021 |

*Primary Examiner* — Pritham D Prabhakher
(74) *Attorney, Agent, or Firm* — Winston Hsu

(57) ABSTRACT

An image compensation circuit for controlling a luminance of a display panel is configured to: receive a plurality of image data; perform gamma tuning to convert the plurality of image data into a plurality of original gamma codes according to a plurality of first compensation values corresponding to a first operation mode; calculate a plurality of gamma difference values between the plurality of first compensation values and a plurality of second compensation values corresponding to a second operation mode; and calculate a plurality of output gamma codes corresponding to the second operation mode according to the plurality of original gamma codes by using the plurality of gamma difference values.

17 Claims, 19 Drawing Sheets

(56) References Cited

U.S. PATENT DOCUMENTS

| | | | |
|---|---|---|---|
| 11,610,528 B2* | 3/2023 | Kim | G09G 3/006 |
| 2017/0053596 A1* | 2/2017 | Hyun | G09G 3/3233 |
| 2020/0051508 A1* | 2/2020 | Tan | G09G 3/3291 |
| 2020/0111423 A1* | 4/2020 | Orio | G09G 3/3225 |
| 2020/0251033 A1* | 8/2020 | Ma | G09G 3/20 |
| 2020/0279519 A1* | 9/2020 | Orio | G09G 3/3233 |
| 2021/0020098 A1* | 1/2021 | Yum | G09G 3/3208 |
| 2021/0193034 A1* | 6/2021 | Li | G09G 3/3233 |
| 2022/0198977 A1* | 6/2022 | Kim | G09G 3/20 |

* cited by examiner

IMAGE COMPENSATION CIRCUIT FOR GAMMA CALIBRATION

CROSS REFERENCE TO RELATED APPLICATIONS

This application claims the benefit of U.S. Provisional Application No. 63/321,077, filed on Mar. 17, 2022. The content of the application is incorporated herein by reference.

BACKGROUND OF THE INVENTION

1. Field of the Invention

The present invention relates to an image compensation circuit, and more particularly, to an image compensation circuit used for gamma calibration.

2. Description of the Prior Art

FIG. 1 illustrates the IR-drop phenomenon appearing on a current-driving display panel. The IR-drop, which is a voltage drop resulting from currents flowing through parasitic resistors on the display panel, may generate luminance inconsistency under the deployment of power lines and their parasitic resistance and the current direction toward the overall panel from the power source. As shown in FIG. 1, in the absence of IR-drop, all pixels receive the same power supply voltage ELVDD, and the luminance of the pixels at positions from near to far relative to the power source is also identical. In the existence of IR-drop, there will be a voltage drop from the near end to the far end of the power source. The near end has a smaller voltage drop (i.e., $\Delta V_1$) and the voltage drop becomes larger with increasing distance (i.e., $\Delta V_1 < \Delta V_2 < \ldots < \Delta V_n$). Therefore, with the same image data, the organic light-emitting diodes (OLEDs) at the position nearer to the power source may receive greater current (i.e., $I_1$). As the distance from the power source becomes larger, the OLEDs at the position farther from the power source may receive less current (i.e., $I_1 > I_2 > \ldots > I_n$), which generates lower luminance. Therefore, a gradient luminance may appear on the panel due to the IR-drop, thereby decreasing the uniformity of the display performance.

A display driver circuit used for the display panel usually drives the display panel by receiving grayscale data, converting the grayscale data into gamma codes, and outputting data voltages corresponding to the gamma codes to the display panel. In general, during the manufacturing process of the display panel, gamma tuning is performed to define the correspondence of grayscale data and gamma codes/voltages for the display panel. In order to solve the IR-drop problem, the gamma mapping in the gamma tuning procedure should be implemented in consideration of IR-drop compensation.

However, the gamma tuning is performed only one time in the assembly line for manufacturing the display panel. If it is required to modify the setting of the display panel or the compensation mode, new compensation values should be obtained and the gamma tuning should be performed again. This generates a large burden on the assembly line. In addition, it is difficult to make the gamma tuning procedure adapted to various settings of IR-drop compensation, where different compensation values are required for different settings. Sometimes the compensation result may not be satisfactory due to several defects such as burn-in, power node impedance, test failure or other reasons, and these defects may be found after the gamma tuning is completed. In such a situation, the panel product should be sent back to the assembly line to perform the gamma tuning again, which requires a great amount of effort and time. Thus, there is a need for improvement over the prior art.

SUMMARY OF THE INVENTION

It is therefore an objective of the present invention to provide a novel image compensation circuit capable of IR-drop compensation and gamma calibration, so as to solve the abovementioned problems.

An embodiment of the present invention discloses an image compensation circuit for controlling a luminance of a display panel. The image compensation circuit is configured to: receive a plurality of image data; perform gamma tuning to convert the plurality of image data into a plurality of original gamma codes according to a plurality of first compensation values corresponding to a first operation mode; calculate a plurality of gamma difference values between the plurality of first compensation values and a plurality of second compensation values corresponding to a second operation mode; and calculate a plurality of output gamma codes corresponding to the second operation mode according to the plurality of original gamma codes by using the plurality of gamma difference values.

Another embodiment of the present invention discloses an image compensation circuit for controlling a luminance of a display panel. The image compensation circuit is configured to: receive a plurality of image data; perform gamma tuning to convert the plurality of image data into a plurality of gamma codes according to a plurality of compensation values; and calibrate the plurality of gamma codes after the gamma tuning is performed.

Another embodiment of the present invention discloses an image compensation circuit for controlling a luminance of a display panel. The image compensation circuit is configured to: receive a plurality of image data; calculate a plurality of first compensation values corresponding to a first setting; and calculate at least one parameter for generating a plurality of second compensation values corresponding to a second setting according to the plurality of first compensation values.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
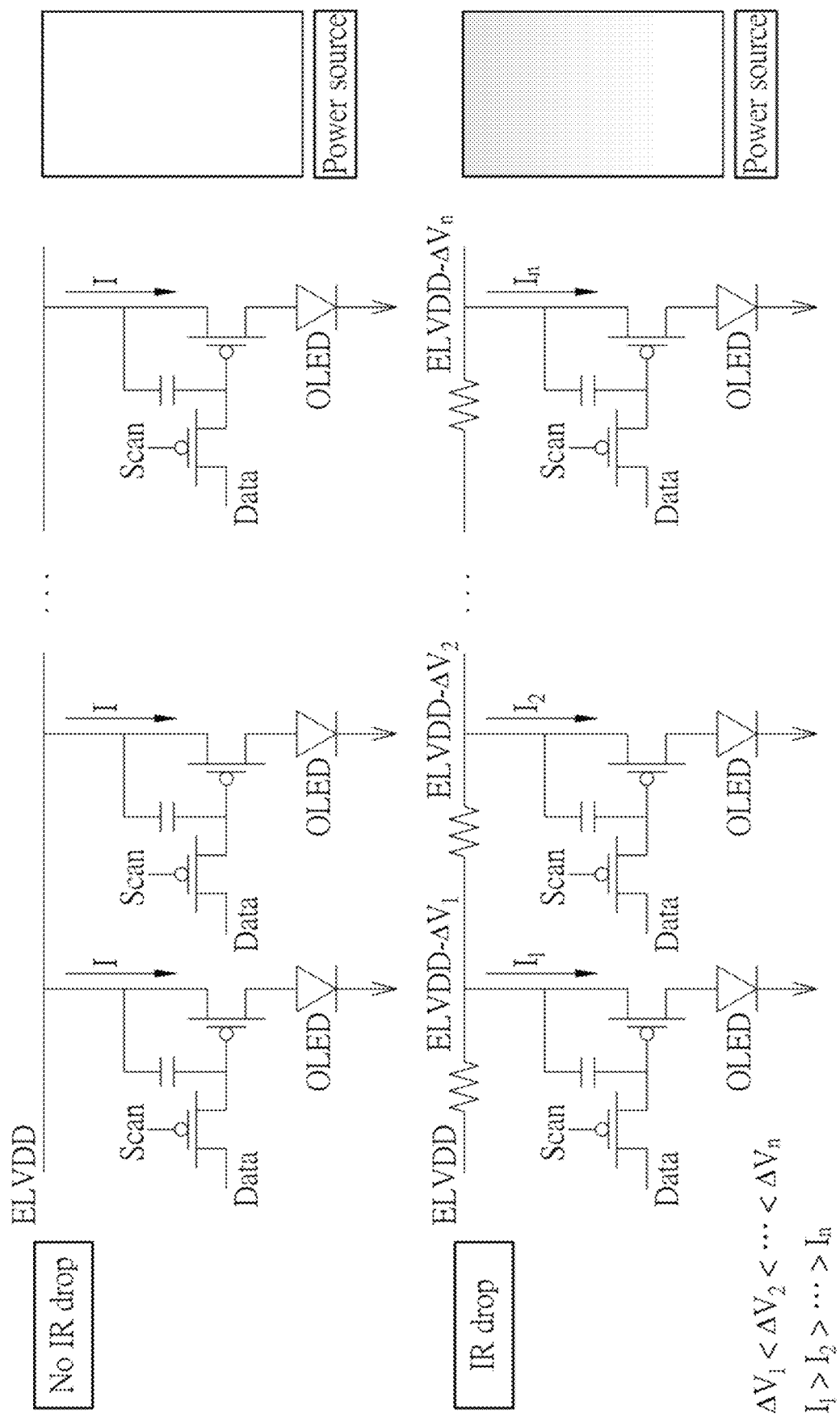
FIG. 1 illustrates the IR-drop phenomenon appearing on a current-driving display panel.
Figure 2:
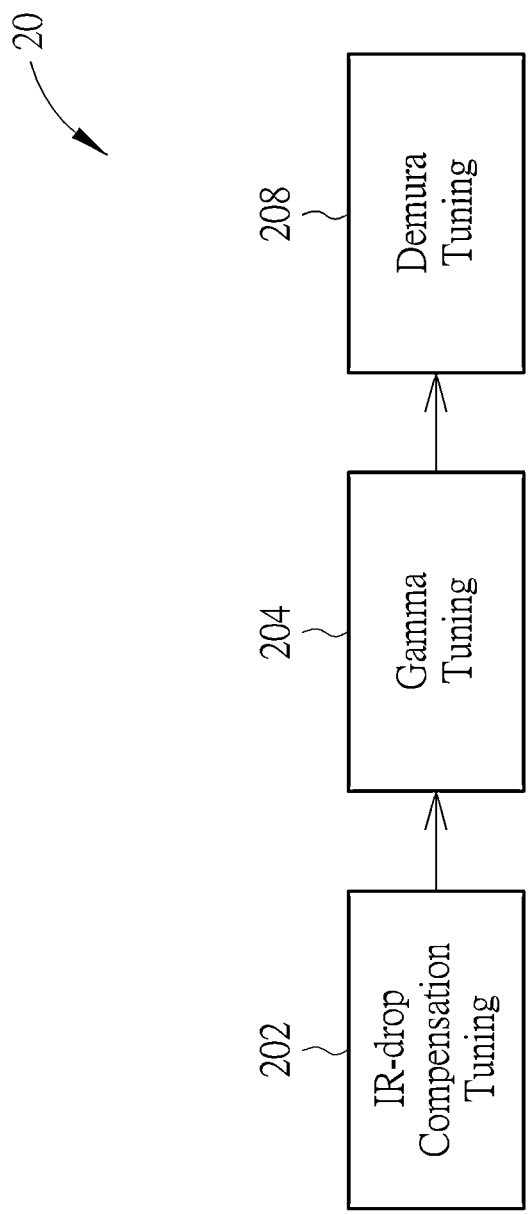
FIG. 2 is a flowchart of a general image compensation process.

FIG. 2 is a flowchart of a general image compensation process 20. The image compensation process 20 includes steps of IR-drop compensation tuning 202, gamma tuning 204 and demura tuning 208. The IR-drop compensation tuning 202 is applied to compensate for the IR-drop phenomenon on the display panel. The IR-drop compensation may be performed in the gamma domain, data domain or voltage domain. For example, in an implementation of the gamma domain, compensation values for the IR-drop may be found and used to modify the original gamma codes. The gamma tuning 204 is applied to find the correspondence of grayscale data and gamma codes. Since the gamma tuning 204 is performed when the IR-drop compensation is completed, the found gamma codes are already compensated and well mapped to the grayscale data. The gamma tuning 204 may further be followed by other compensation processes such as the demura tuning 208, as shown in FIG. 2.

Figure 3:
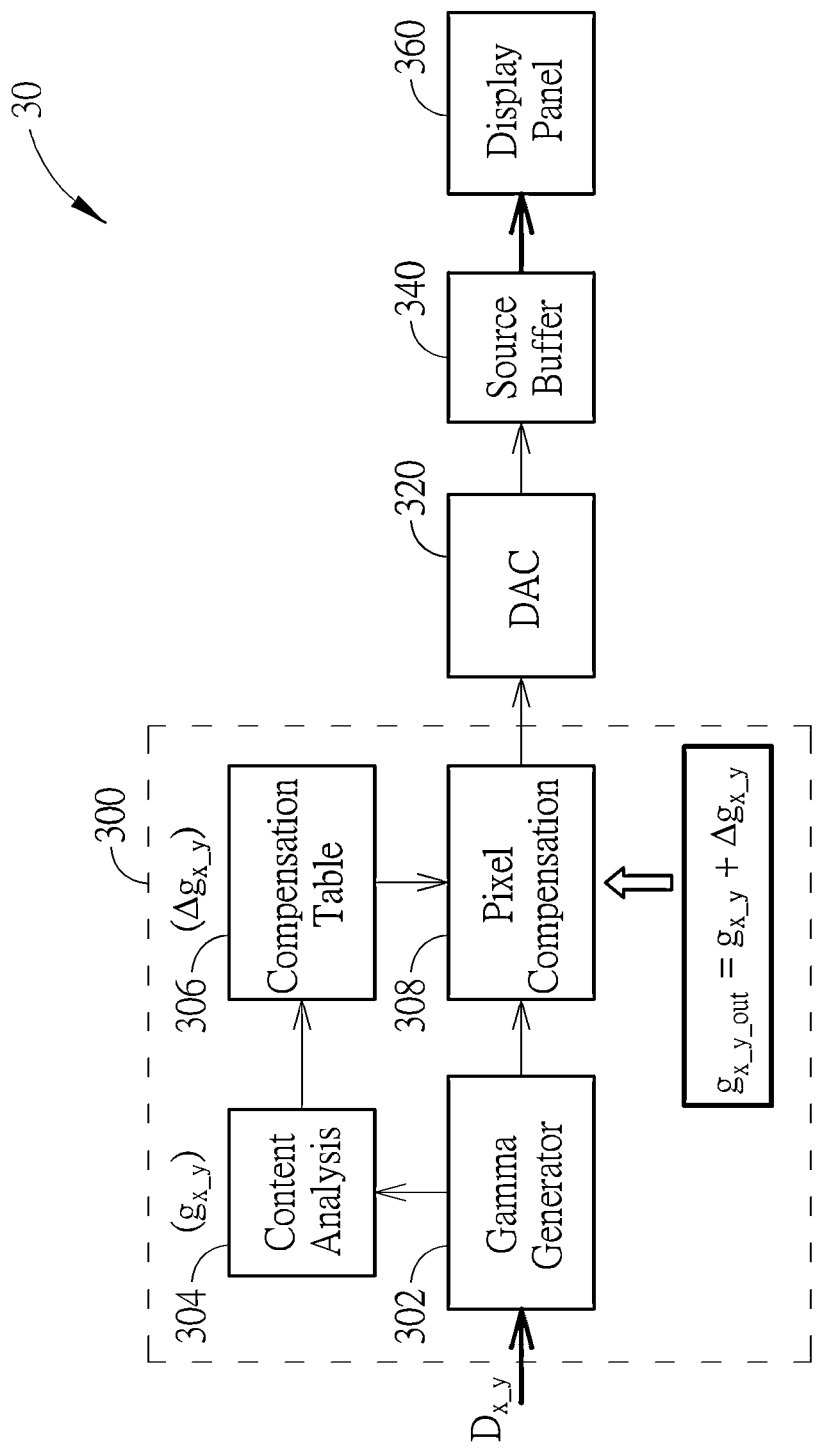
FIG. 3 is a schematic diagram of a display driver circuit.

FIG. 3 is a schematic diagram of a display driver circuit 30. The display driver circuit 30 includes an image compensation circuit 300, a digital-to-analog converter (DAC) 320 and a source buffer 340. The source buffer 340 may output gamma voltages as driving voltages to a display panel 360, which is also shown in FIG. 3 to facilitate the illustrations. The DAC 320 is configured to convert the gamma codes into the gamma voltages. The detailed operations of the DAC 320 and the source buffer 340 are well known by a person of ordinary skill in the art, and will not be narrated herein.

The image compensation circuit 300, which may be used to compensate for the IR-drop of the display panel 360, includes a gamma generator 302, a content analysis circuit 304, a compensation table 306 and a pixel compensation circuit 308. The image compensation circuit 300 is configured to perform the IR-drop compensation in the gamma code domain. In detail, the gamma generator 302 may convert input image data $D_{x\_y}$ into gamma codes $g_{x\_y}$, where x and y are positive integers representing the coordinate of pixels on the display panel 360. By analyzing the gamma codes $g_{x\_y}$, the content analysis circuit 304 may determine the image content to obtain the voltage attenuation at each position. The content analysis circuit 304 thereby accesses the compensation table 306 to obtain gamma compensation values $\Delta g_{x\_y}$ for every pixel. The pixel compensation circuit 308 then combines the received gamma codes $g_{x\_y}$ with the gamma compensation values $\Delta g_{x\_y}$ to generate output gamma codes $g_{x\_y\_out}$ corresponding to each pixel of the display panel 360. Afterwards, the output gamma codes $g_{x\_y\_out}$ will be converted into gamma voltages (through the DAC 320) to be output to the display panel 360 (through the source buffer 340).

As mentioned above, the gamma tuning should be performed with a predetermined setting of IR-drop compensation. However, the display device may operate in different operation modes to be adapted to various application scenarios, and these operation modes may require different IR-drop compensation settings to have different sets of compensation values. If the setting is modified or the operation mode changes after the gamma tuning operation, the previous compensation values may not be applicable, such that the gamma tuning operation may be performed again. In order to solve this problem, the present invention provides several embodiments where the image compensation circuit is capable of applying appropriate gamma compensation values in various operation modes to realize the IR-drop compensation.

Embodiment 1

In Embodiment 1, an IR-drop mode gamma calibration circuit is provided to calculate the difference between gamma compensation values for different operation modes, so that the gamma tuning may be performed based on a reference operation mode, to reduce the number of times of gamma tuning. Among the operation modes for various scenarios, one operation mode may be selected as the reference operation mode for gamma tuning. The operation mode taken for performing gamma tuning may be used to calculate a set of gamma codes, which are considered as a gamma target used as a reference to obtain other sets of gamma codes used for other operation modes. For example, a set of gamma difference values may be obtained based on the difference between the gamma codes of the gamma target and the gamma codes of each of the other operation modes. The output gamma codes may be calculated by incorporating the gamma difference values after the gamma tuning procedure, so as to ensure the accuracy of gamma compensation in all of the operation modes under various IR-drop compensation scenarios.

Figure 4:
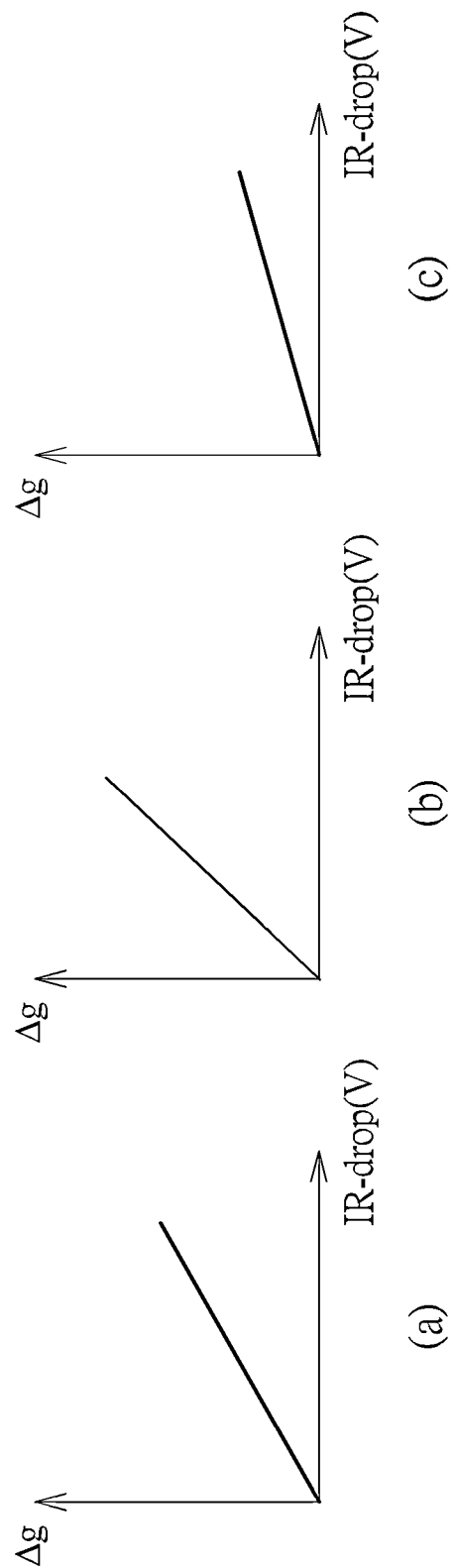
FIG. 4 illustrates three different operation modes for IR-drop compensation.

FIG. 4 illustrates three different operation modes for IR-drop compensation, where FIG. 4(a) shows a stronger compensation, FIG. 4(b) shows a medium compensation, and FIG. 4(c) shows a weaker compensation. These operation modes may require different gamma compensation values Δg for generating the corresponding output gamma codes. Note that the operation modes applicable to the present invention may also include the uniformity compensation mode, high contrast mode, or any other possible display mode that can be used to determine the display feature of the panel.

Figure 5:
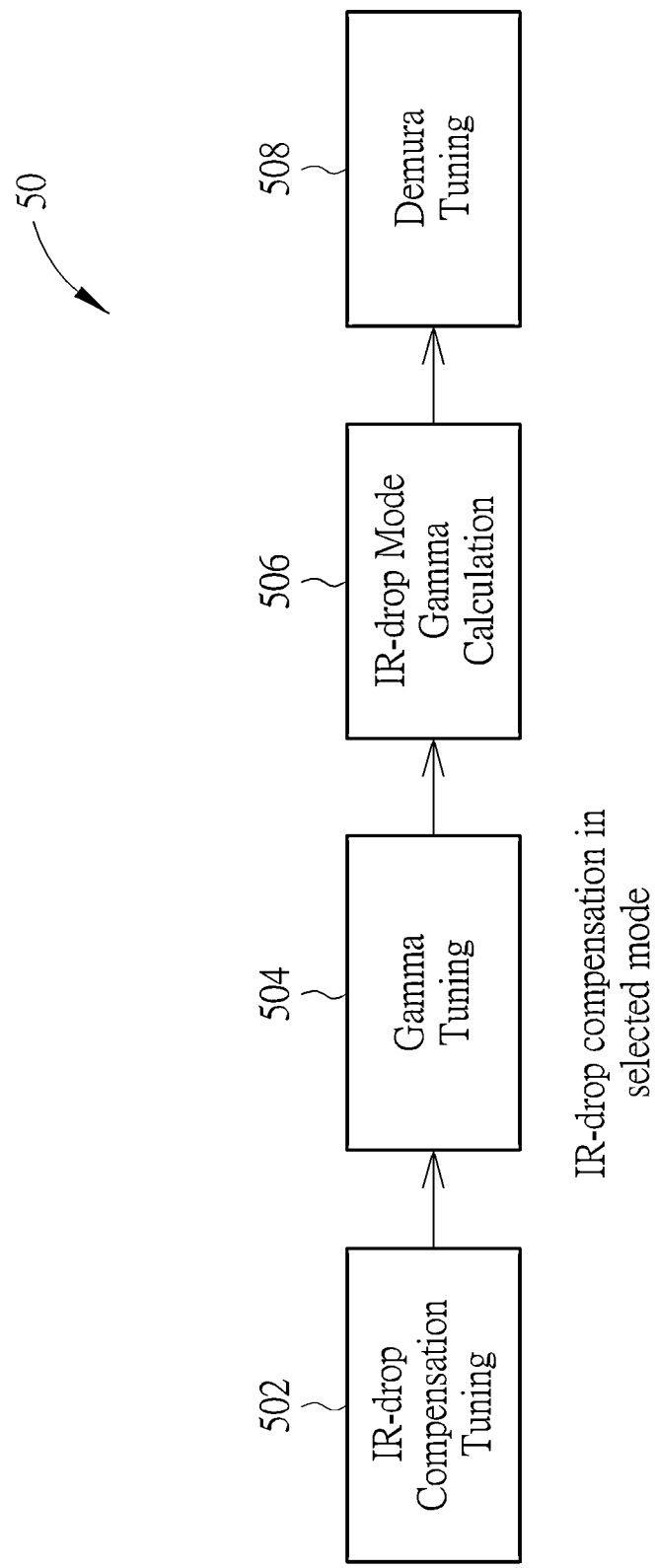
FIG. 5 is a flowchart of an image compensation process according to an embodiment of the present invention.

FIG. 5 is a flowchart of an image compensation process 50 according to an embodiment of the present invention. The image compensation process 50 includes steps of IR-drop compensation tuning 502, gamma tuning 504, IR-drop mode gamma calculation 506 and demura tuning 508. The operations of the IR-drop compensation tuning 502, the gamma tuning 504 and the demura tuning 508 are similar to those of the IR-drop compensation tuning 202, the gamma tuning 204 and the demura tuning 208 shown in FIG. 2. The difference between the image compensation process 50 and the image compensation process 20 is that, the image compensation process 50 further includes the IR-drop mode gamma calculation 506, which is performed to generate the gamma difference values for various operation modes. In the gamma tuning 504, a specific operation mode may be taken to generate the gamma codes with a set of gamma compensation values. Based on the gamma compensation values of each operation mode, the difference value of the gamma compensation values of the selected operation mode (i.e., a reference operation mode) for gamma tuning and the gamma compensation values of another operation mode may be obtained.

In an embodiment, the gamma difference values between the selected operation mode and any other operation mode may be calculated in advance and stored in a look-up table (LUT). Therefore, in the operations of the IR-drop mode gamma calculation 506 after the gamma tuning 504, the gamma difference values between the gamma compensation values of the reference operation mode and the target operation mode may be taken from the LUT when the display system is requested to operate in the target operation mode; hence, the gamma compensation values for the target operation mode may be calculated.

In another embodiment, the IR-drop mode gamma calculation 506 may be implemented in the image compensation circuit for controlling the display panel. Therefore, the gamma difference values may be calculated when the image compensation circuit is configured to operate in the target operation mode while the related gamma tuning is performed based on the reference operation mode.

Figure 6:
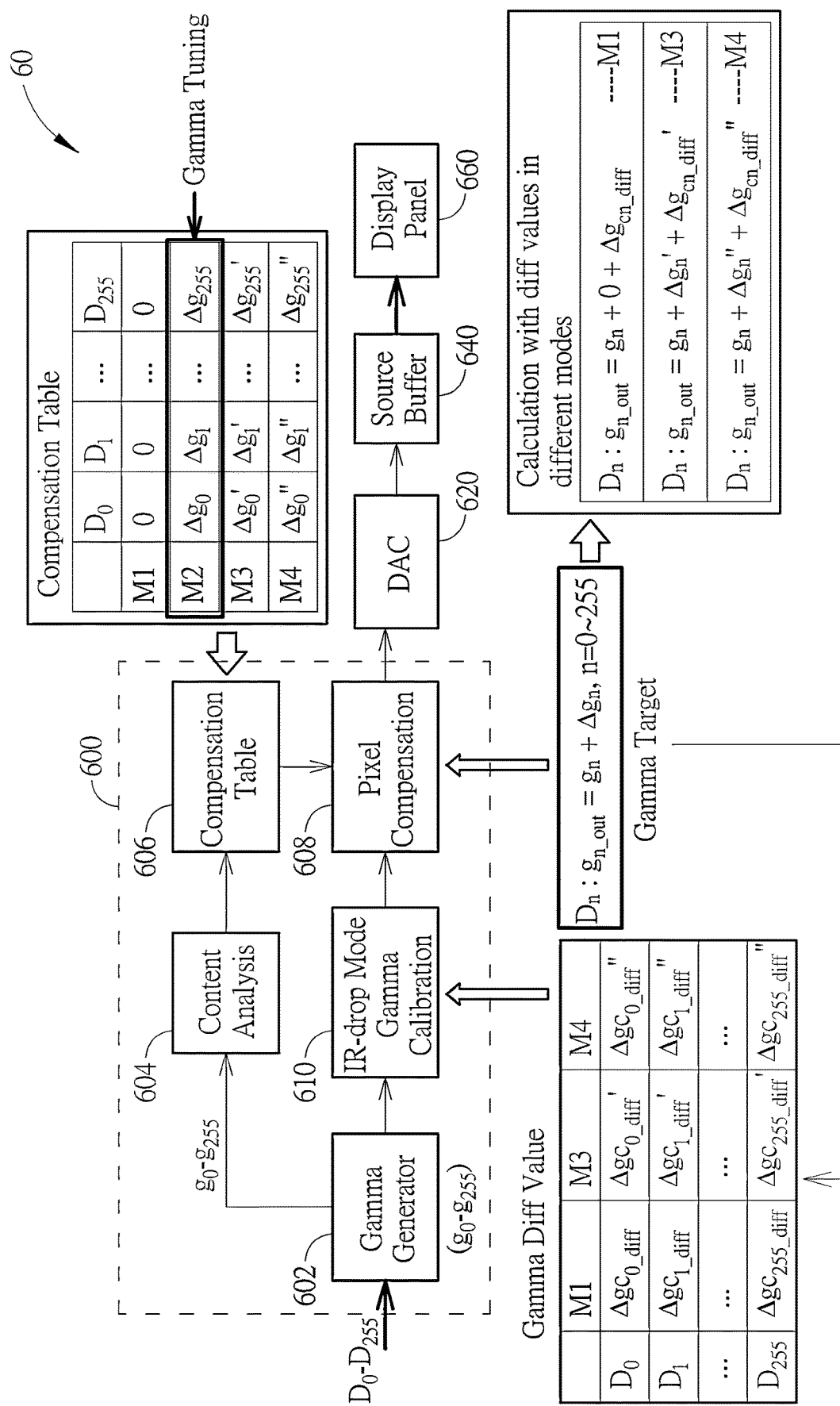
FIG. 6 is a schematic diagram of a display driver circuit according to an embodiment of the present invention.

FIG. 6 is a schematic diagram of a display driver circuit 60 according to an embodiment of the present invention. The display driver circuit 60 includes an image compensation circuit 600, a DAC 620 and a source buffer 640. The source buffer 640 may output gamma voltages as driving voltages to a display panel 660, which is also shown in FIG. 6 to facilitate the illustrations. The DAC 620 is configured to convert the gamma codes into the gamma voltages.

The image compensation circuit 600, which is used to compensate for the IR-drop of the display panel 660, may be integrated in a source driver or a control integrated circuit (IC) for the display panel 660. The image compensation circuit 600 includes a gamma generator 602, a content analysis circuit 604, a compensation table 606, a pixel compensation circuit 608 and an IR-drop mode gamma calculation circuit 610. The image compensation circuit 600 is configured to perform the IR-drop compensation in the gamma code domain. In detail, the gamma generator 602 may receive image data $D_0$-$D_{255}$ and convert the image data $D_0$-$D_{255}$ into gamma codes $g_0$-$g_{255}$. The image data $D_0$-$D_{255}$ refer to a series of grayscale data having any values among grayscale levels 0-255, and the gamma codes $g_0$-$g_{255}$ are used to represent gamma voltages corresponding to the image data $D_0$-$D_{255}$, respectively.

In this embodiment, the IR-drop information should be taken into consideration in the gamma tuning procedure, and there are multiple operation modes with different sets of gamma compensation values; hence, the gamma tuning may be performed according to one set of gamma compensation values corresponding to a selected operation mode, e.g., a first operation mode, which is used as a gamma target (i.e., the reference, or called golden). In this manner, the content analysis circuit 604 may analyze the image content and access the gamma compensation values from the compensation table 606 based on the first operation mode, and the pixel compensation circuit 608 may compensate the gamma codes by using the gamma compensation values for the first operation mode.

If the gamma compensation values corresponding to the first operation mode are applied to perform gamma tuning and IR-drop compensation while the image compensation circuit 600 needs to operate in another operation mode, the conventional gamma tuning procedure may generate a set of wrong output gamma codes. In contrast, in an embodiment of the present invention, the IR-drop mode gamma calculation circuit 610 may calculate a set of gamma difference values between the gamma compensation values corresponding to the first operation mode and the gamma compensation values corresponding to another operation mode, e.g., a second operation mode. Supposing that the image compensation circuit 600 operates in the second operation mode, the IR-drop mode gamma calculation circuit 610 may calculate the gamma difference values and incorporate the gamma difference values into the gamma codes, and the pixel compensation circuit 608 may generate the output gamma codes including the information of the gamma compensation values corresponding to the first operation mode and the information of the gamma difference values.

In an embodiment, the calculated gamma difference values may be stored in an LUT, and the pixel compensation circuit 608 may take the gamma difference values corresponding to a target operation mode from the LUT when this target operation mode is applied.

As shown in FIG. 6, there are four operation modes M1-M4 for IR-drop compensation, where each operation mode has a set of gamma compensation values, which may be stored in the compensation table 606. In detail, the first operation mode M1 is defined to have no IR-drop compensation and the related gamma compensation values are all 0. Other operation modes M2-M4 have gamma compensation values $\Delta g_n$, $\Delta g_n'$, and $\Delta g_n''$, respectively, where n may be any of integer values from 0 to 255 as corresponding to the values of the image data $D_0$-$D_{255}$ and/or the gamma codes $g_0$-$g_{255}$. Note that the gamma tuning procedure is used to find the mapping of the grayscale data and the gamma codes. Different grayscale values with different brightness may usually have different gamma compensation values for IR-drop, which may be calculated respectively and stored in the compensation table 606.

In this embodiment, the gamma compensation values $\Delta g_n$ corresponding to the operation mode M2 may be selected as the gamma target, and the gamma tuning is performed based on the operation mode M2 to obtain the output gamma codes $g_{n\_out}$ by incorporating the gamma compensation values $\Delta g_n$ of the operation mode M2. As for the other operation modes M1, M3 and M4, the IR-drop mode gamma calculation circuit 610 may calculate the gamma difference values $\Delta gc_{n\_diff}$, $\Delta gc_{n\_diff}'$ and $\Delta gc_{n\_diff}''$, respectively, where n may be any of integer values from 0 to 255 as corresponding to the values of the image data $D_0$-$D_{255}$ and/or the gamma codes $g_0$-$g_{255}$. The obtained gamma difference values $\Delta gc_{n\_diff}$, $\Delta gc_{n\_diff}'$ and $\Delta gc_{n\_diff}''$ should be able to fit the target of gamma tuning which is performed based on the operation mode M2.

In detail, under the operation mode M2, the gamma tuning may generate the output gamma codes $g_{n\_out}$ including the gamma compensation values $\Delta g_n$; that is, $$g_{n\_out} = g_n + \Delta g_n, \; n = 0 \sim 255.$$

The IR-drop mode gamma calculation circuit 610 thereby uses these output gamma codes $g_{n\_out}$ as a reference to calculate the gamma difference values $\Delta gc_{n\_diff}$, $\Delta gc_{n\_diff}'$ and $\Delta gc_{n\_diff}'$ as follows:

$$g_{n\_out} = g_n + \Delta g_n = g_n + 0 + \Delta gc_{n\_diff}, \; \text{for } M1;$$

$$g_{n\_out} = g_n + \Delta g_n = g_n + \Delta g_n' + \Delta gc_{n\_diff}', \; \text{for } M3;$$

$$g_{n\_out} = g_n + \Delta g_n = g_n + \Delta g_n'' + \Delta gc_{n\_diff}'', \; \text{for } M4.$$

Therefore, when an operation mode other than M2 is applied, the corresponding gamma difference values may be added to the original gamma codes g0-g255 during the gamma tuning procedure, and the gamma tuning output is further combined with the gamma difference values $\Delta gc_{n\_diff}$, $\Delta gc_{n\_diff}'$ or $\Delta gc_{n\_diff}''$ of the target operation mode to generate the correct output gamma codes $g_{n\_out}$.

Please note that the IR-drop compensation requires that different positions or pixels of the display panel 660 have different compensation values since the influence caused by IR-drop varies depending on the pixel distance from the power source. The above gamma compensation values (e.g., $\Delta g_n$) associated with a specific grayscale value n may be calculated based on a specific position of the display panel 660, such as the center pixel. In other words, the set of gamma compensation values (e.g., $\Delta g_0$-$\Delta g_{255}$) which are stored in the LUT may be corresponding to the compensation of the center pixel. Therefore, the corresponding gamma difference values (e.g., $\Delta gc_{0\_diff}$-$\Delta gc_{255\_diff}$) which are generated by the IR-drop mode gamma calculation circuit 610 may also be corresponding to the compensation of the center pixel. More specifically, each gamma difference value may indicate the difference of the compensation value of the reference operation mode and the compensation value of another operation mode corresponding to the center pixel.

Therefore, the gamma compensation values and corresponding difference values for another pixel may be calculated based on the received grayscale value and also based on the gamma compensation value for the center pixel. For example, a pixel farther from the power source may obtain a higher gamma compensation value as compared to the gamma compensation value for the center pixel, and a pixel closer to the power source may obtain a lower gamma compensation value as compared to the gamma compensation value for the center pixel.

In another embodiment, the gamma compensation values used for gamma tuning may be based on any specific pixel on the display panel 660 such as the pixel at the upper left corner, and those gamma compensation values corresponding to difference values for other pixels may be calculated accordingly.

Figure 7:
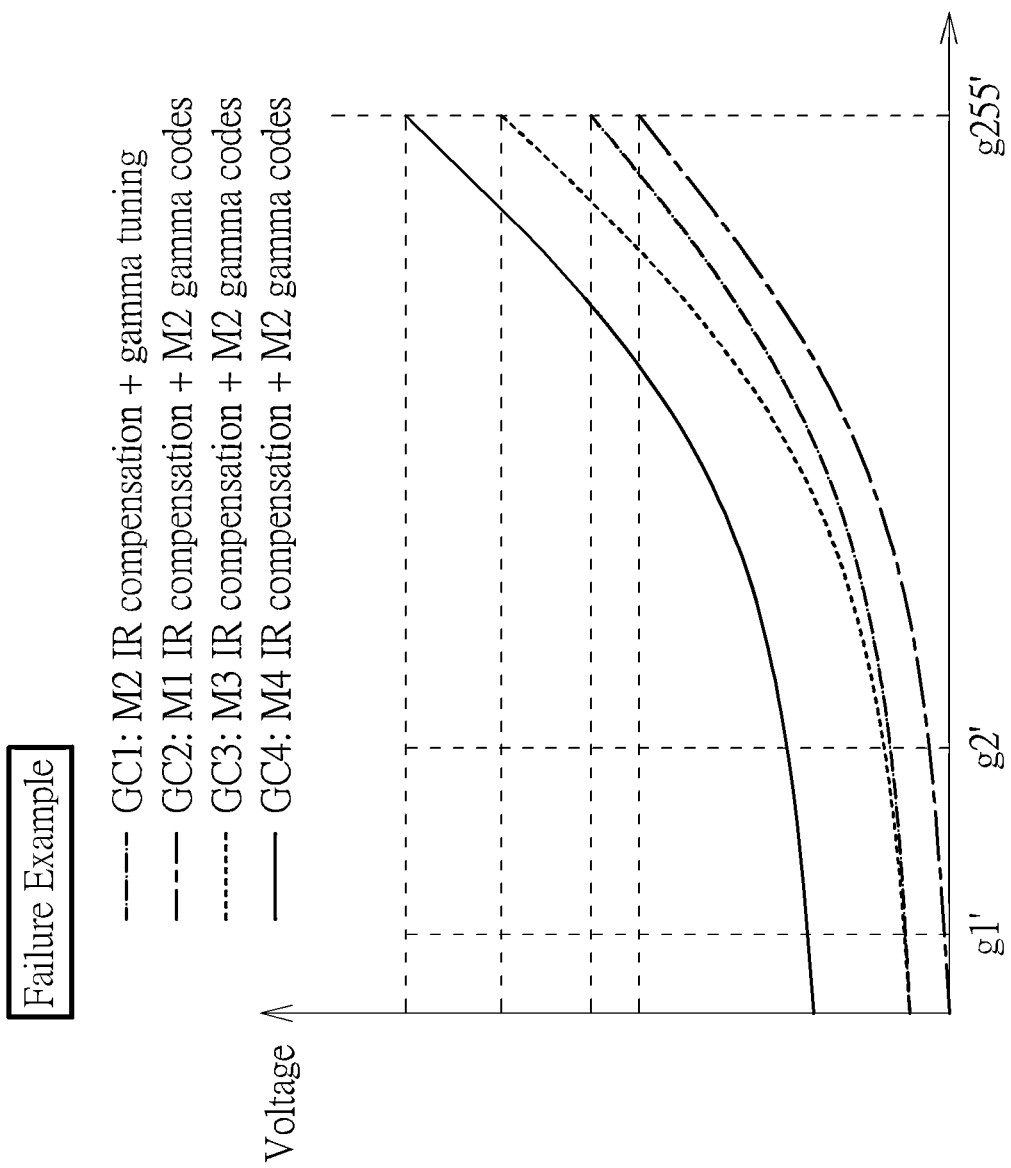
FIG. 7 illustrates the gamma curves for the operation modes without correction of different IR-drop modes in a failure example.

FIG. 7 illustrates a failure example, where the gamma curves for the operation modes M1-M4 without correction of different IR-drop modes are shown. The gamma curves, which show the mapping of gamma codes g1'-g255' and output driving voltages, may be obtained based on the output gamma codes generated from gamma tuning. That is, there are 4 gamma curves GC1-GC4, where the gamma curve GC1 is generated through the IR-drop compensation of the operation mode M2 with related gamma tuning, and the gamma curves GC2-GC4 are generated through the IR-drop compensation of the operation modes M1, M3 and M4, respectively, with the gamma codes of the operation mode M2. In this example, since the gamma tuning is performed based on the operation mode M2, the output gamma codes generated after the IR-drop compensation of the operation mode M2 may generate a correct gamma curve for the operation mode M2, while the same gamma codes in other operation modes after the IR-drop compensation may generate wrong gamma curves.

Figure 8:
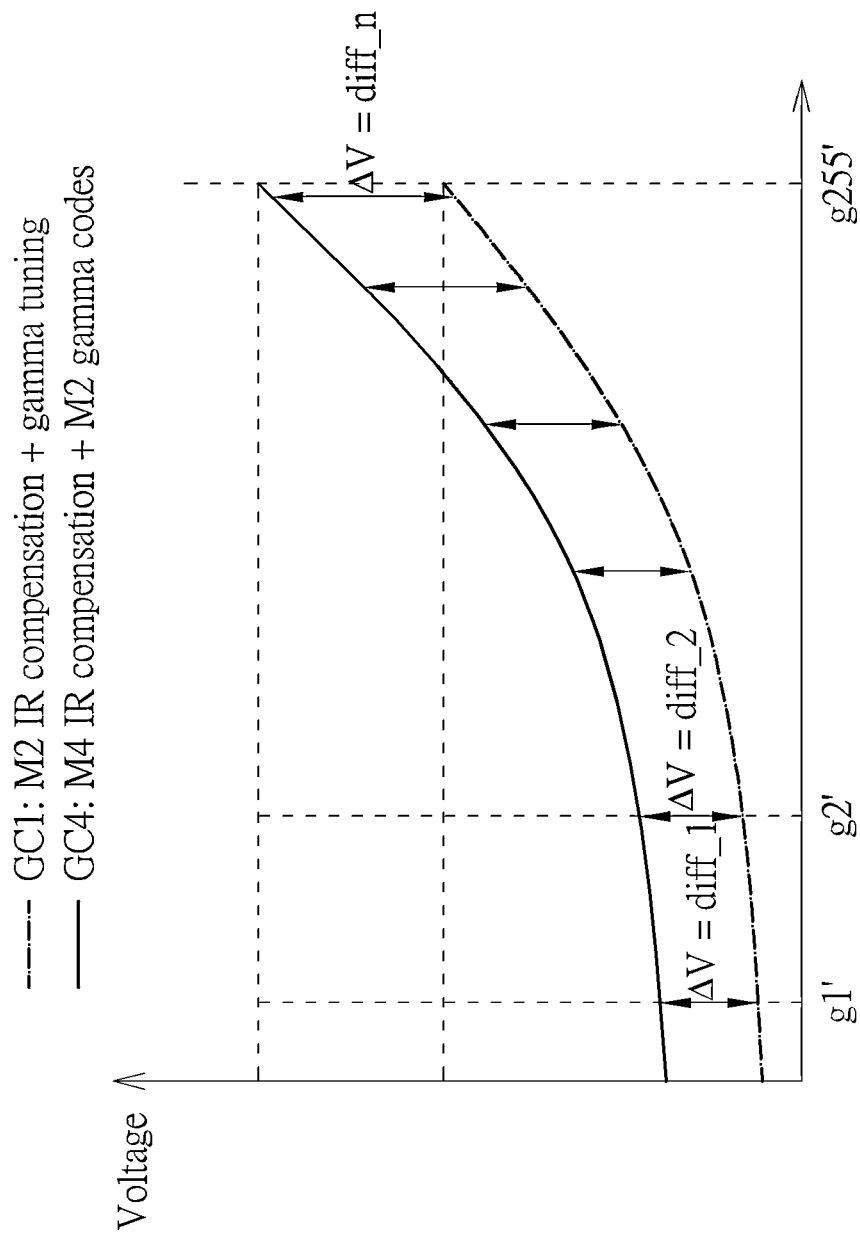
FIG. 8 illustrates correction of the gamma curve for the operation mode.

In order to correct the gamma curve, the gamma difference values may be incorporated to generate the output gamma codes. FIG. 8 illustrates correction of the gamma curve GC4 for the operation mode M4. In the operation mode M4, the gamma tuning with IR-drop compensation based on the operation mode M2 is performed, and the generated gamma codes are modified by adding a set of gamma difference values, diff_n, n=0~255, to fit the gamma curve GC1 for the operation mode M2. The set of gamma difference values diff_n may correct the gamma curve GC4, ensuring the consistency of display performance when the display panel operates in the operation mode M4. Note that other operation modes, M1 and M3, may have their respective set of gamma difference values, and the IR-drop mode gamma calibration circuit 610 shown in FIG. 6 is capable of obtaining or calculating accurate gamma difference values for the target operation mode.

Figure 9:
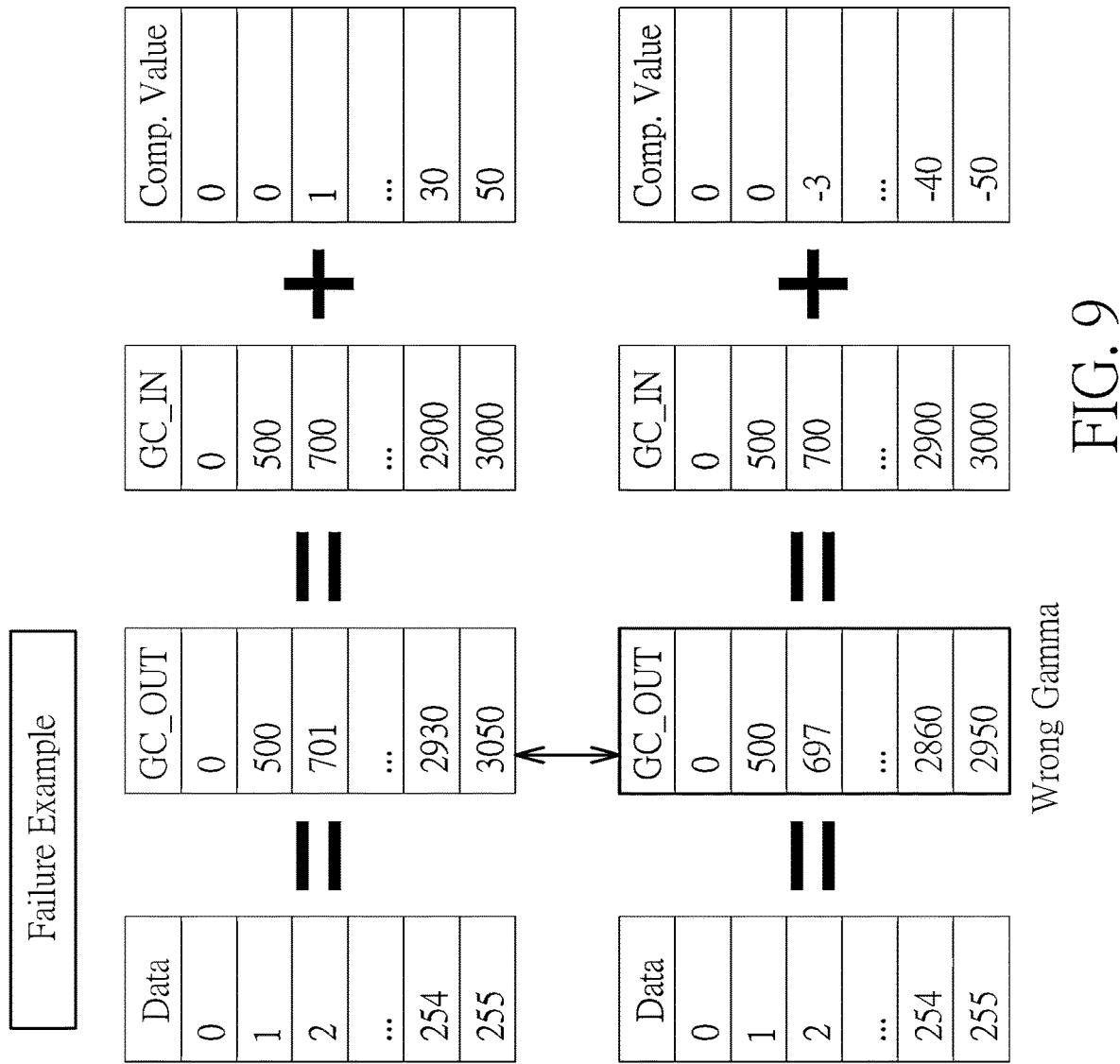
FIG. 9 illustrates another failure example numerically.

FIG. 9 illustrates another failure example numerically, where the grayscale data, output gamma codes (GC_OUT), input gamma codes (GC_IN) and gamma compensation values (which may correspond to the center pixel) are shown. As shown in FIG. 9, the upper tables show a gamma tuning procedure for a reference operation mode such as the operation mode M2 as described above. During the gamma tuning procedure for the operation mode M2, the input gamma codes 0-3000 corresponding to the grayscale data 0-255 may be found. Based on the IR-drop compensation for the operation mode M2, the gamma compensation values may be added to the input gamma codes to generate the output gamma codes, so as to compensate for the IR-drop phenomenon based on the operation mode M2. Accurate output gamma codes may be generated after the gamma tuning and IR-drop compensation associated with the operation mode M2.

The lower tables of FIG. 9 show the failure example, where the same input gamma codes 0-3000 are generated after the gamma tuning procedure for the operation mode M2, while the display panel is configured to operate in another operation mode (e.g., the operation mode M4) which requires different gamma compensation values. In the operation mode M4, the gamma compensation values for the operation mode M2 added to the input gamma codes may generate wrong output gamma codes.

Figure 10:
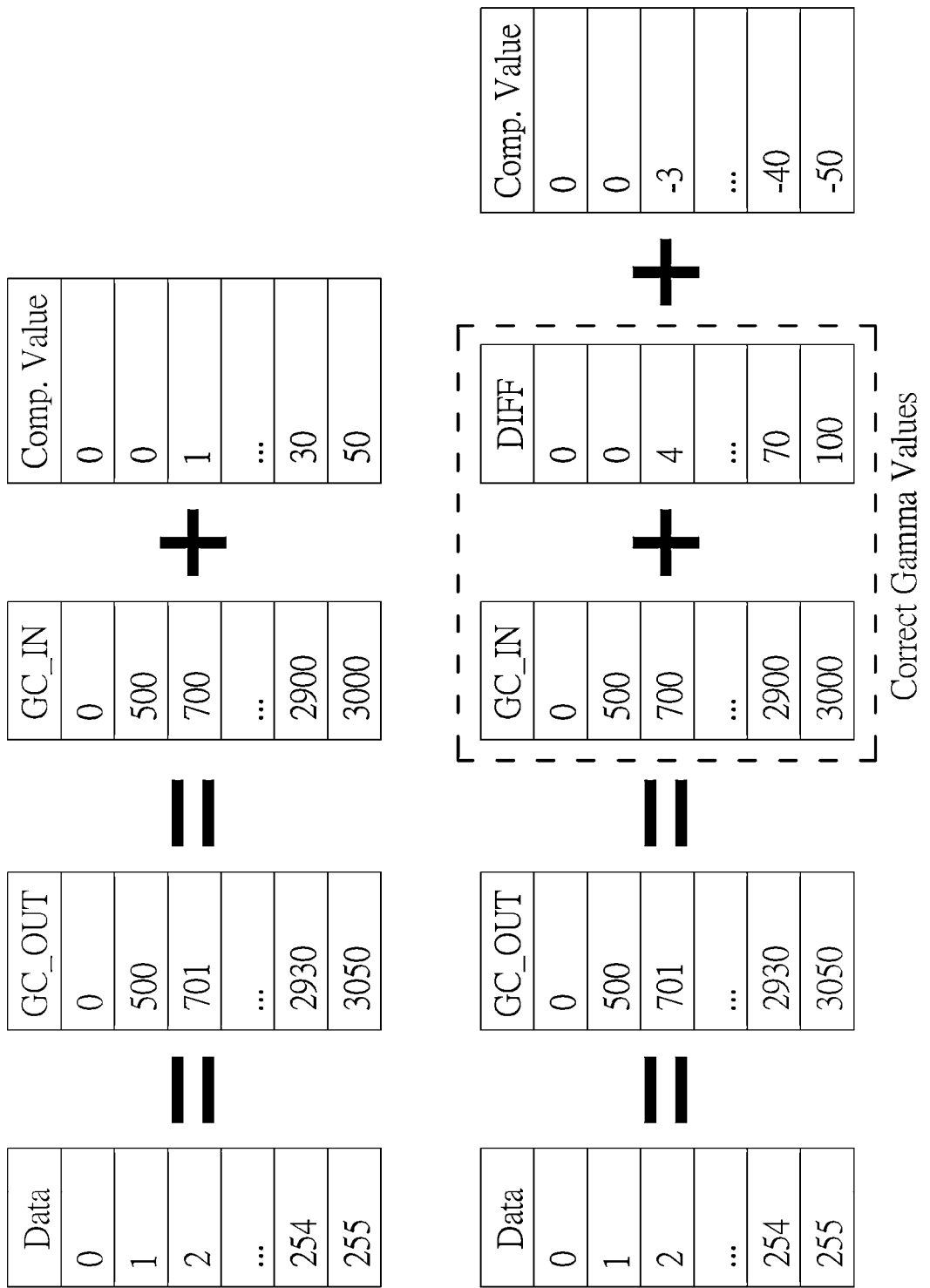
FIG. 10 illustrates that the wrong output gamma codes are compensated by incorporating the gamma difference values.

In this embodiment, the wrong output gamma codes may be compensated by incorporating the gamma difference values (DIFF) as shown in FIG. 10. With the gamma difference values, the output gamma codes may be corrected to have accurate values, so as to keep the luminance performance of the display panel.

Embodiment 2

In Embodiment 2, a compensation calibration circuit is provided to calibrate the output gamma codes after gamma tuning and IR-drop compensation. For example, a defect that causes deviations or errors of the output gamma codes may be found after the gamma tuning procedure and the IR-drop compensation are completed. The compensation calibration circuit may add an offset to the gamma codes to make the final gamma codes accurate.

Figure 11:
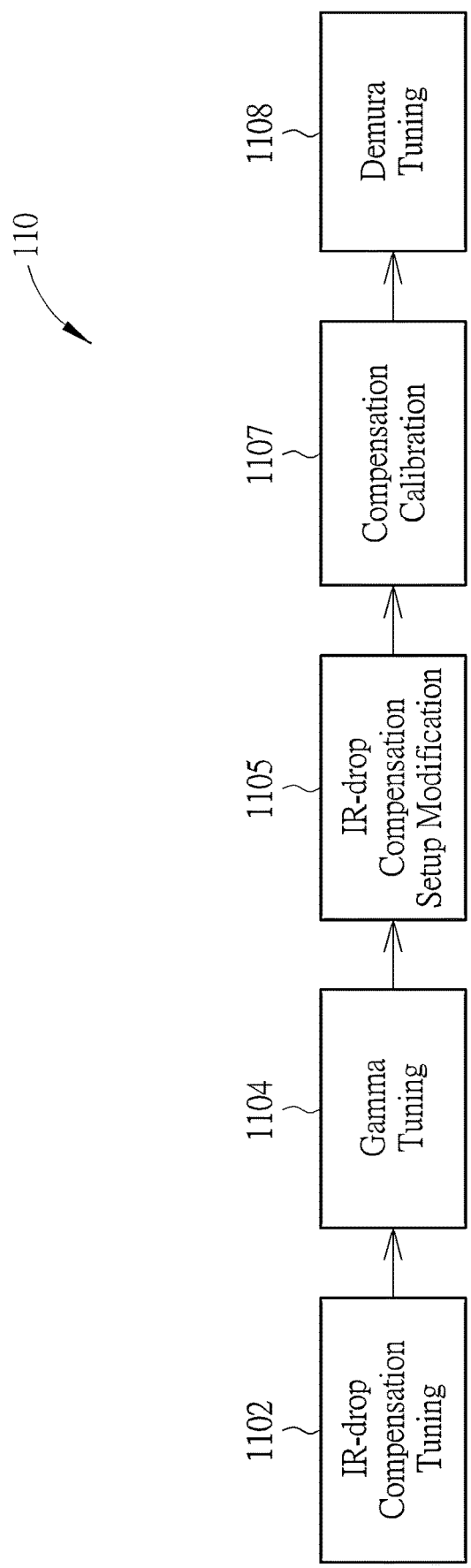
FIG. 11 is a flowchart of an image compensation process according to an embodiment of the present invention.

FIG. 11 is a flowchart of an image compensation process 110 according to an embodiment of the present invention. The image compensation process 110 includes steps of IR-drop compensation tuning 1102, gamma tuning 1104, IR-drop compensation setup modification 1105, compensation calibration 1107 and demura tuning 1108. The operations of the IR-drop compensation tuning 1102, the gamma tuning 1104 and the demura tuning 1108 are similar to those of the IR-drop compensation tuning 202, the gamma tuning 204 and the demura tuning 208 shown in FIG. 2. The difference between the image compensation process 110 and the image compensation process 20 is that, the image compensation process 110 further includes the IR-drop compensation setup modification 1105 and the compensation calibration 1107. As mentioned above, a set of output gamma codes corresponding to a present setting may be generated after the gamma tuning 1104 is completed and the gamma compensation values are incorporated. However, a user may determine to change or modify the display setting; hence, the compensation calibration 1107 may be performed to calibrate or correct the gamma codes after the setting is modified. In this embodiment, the compensation calibration 1107 is performed after the gamma tuning 1104. Note that the compensation calibration 1107 may be performed before or after the demura tuning 1108 or on any appropriate time point after the output gamma codes are generated.

In this embodiment, the gamma codes are calibrated when a setting is modified where different compensation values may be required. In another embodiment, the gamma codes are calibrated when the value(s) of the gamma codes fails to meet a requirement. For example, the operator or user may determine that the display performance is not satisfactory or find that the present gamma codes are incorrect during a product certification process, and thus perform the compensation calibration operation to correct the gamma codes.

Figure 12:
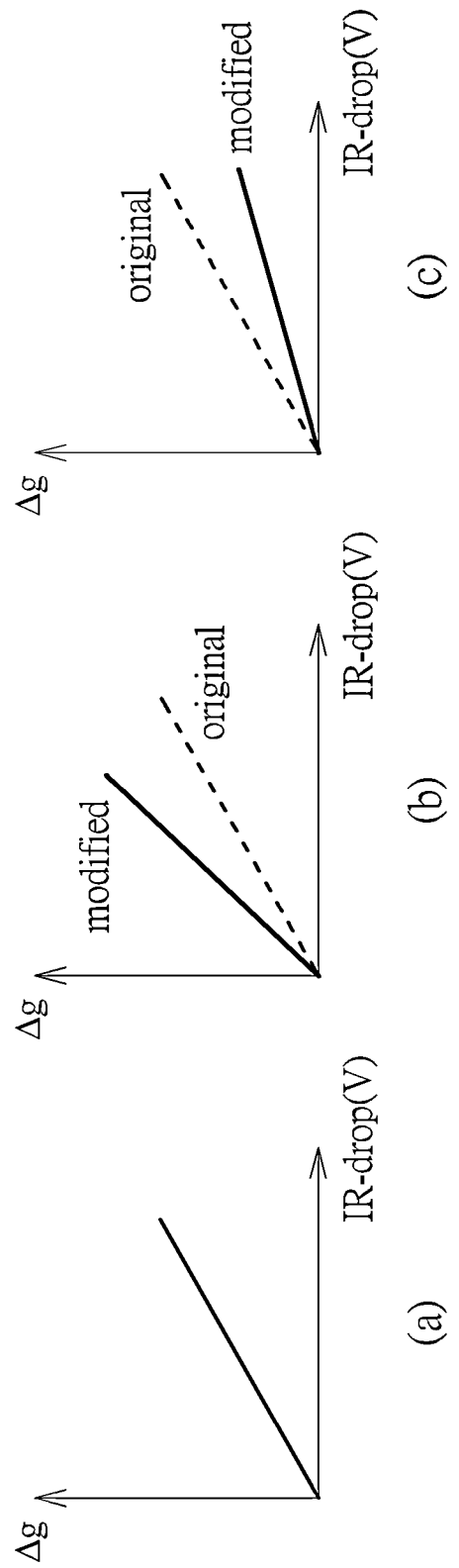
FIG. 12 illustrates exemplary situations where the compensation degree needs to be stronger or weaker.

FIG. 12 illustrates exemplary situations where the compensation degree needs to be stronger or weaker. In detail, FIG. 12(*a*) shows a gamma curve generated after IR-drop compensation, which indicates the gamma compensation values Δg with respect to different degrees of IR-drop. FIG. 12(*b*) shows that the IR-drop compensation is modified to be stronger, and FIG. 12(*c*) shows that the IR-drop compensation is modified to be weaker. According to Embodiment 2, the modification of IR-drop compensation degree may be completed by incorporating calibration difference values to the gamma codes in the compensation calibration procedure instead of performing gamma tuning again.

Figure 13:
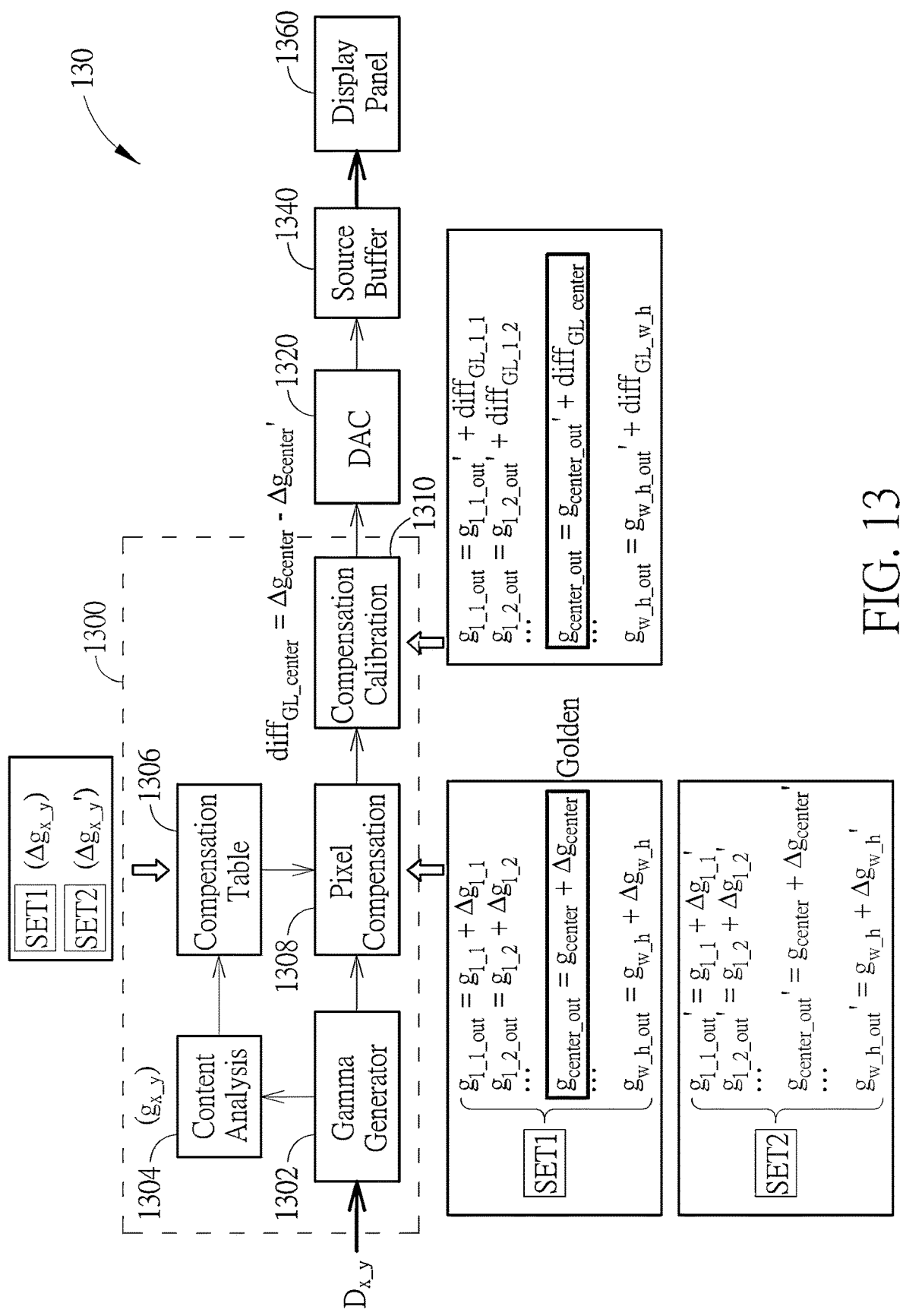
FIG. 13 is a schematic diagram of a display driver circuit according to an embodiment of the present invention.

FIG. 13 is a schematic diagram of a display driver circuit 130 according to an embodiment of the present invention, which illustrates the circuit structure for performing the gamma calibration operation. The display driver circuit 130 includes an image compensation circuit 1300, a DAC 1320 and a source buffer 1340. The source buffer 1340 may output gamma voltages as driving voltages to a display panel 1360, which is also shown in FIG. 13 to facilitate the illustrations. The DAC 1320 is configured to convert the gamma codes into the gamma voltages.

The image compensation circuit 1300, which is used to compensate for the IR-drop of the display panel 1360, may be integrated in a source driver or a control IC for the display panel 1360. The image compensation circuit 1300 includes a gamma generator 1302, a content analysis circuit 1304, a compensation table 1306, a pixel compensation circuit 1308 and a compensation calibration circuit 1310. The gamma generator 1302 may receive a series of image data such as a frame of image data $D_{x\_y}$, where x and y are positive integers representing the coordinate of pixels on the display panel 1360. In an embodiment, the image data $D_{x\_y}$ may be grayscale data.

In this embodiment, there are two settings SET1 and SET2 having different gamma compensation values $\Delta g_{x\_y}$ and $\Delta g_{x\_y}'$, respectively. Suppose that the setting SET1 is the original setting used to generate the output gamma codes, and that the setting SET2 is the new setting to which the display panel 1360 or the display driver circuit 130 or the image compensation circuit 1300 changes. A calibration difference value between the settings SET1 and SET2 may be calculated and applied to calibrate the gamma codes when the setting changes.

In detail, the gamma generator 1302 may convert the image data $D_{x\_y}$ into gamma codes $g_{x\_y}$. The content analysis circuit 1304 may analyze the image content and access the gamma compensation values $\Delta g_{x\_y}$ from the compensation table 1306 based on the original setting SET1, and the pixel compensation circuit 1308 may compensate the gamma codes by using the gamma compensation values $\Delta g_{x\_y}$ for the setting SET1. More specifically, the pixel compensation circuit 1308 may generate the output gamma codes $g_{x\_y\_out}$ by adding the gamma compensation values $\Delta g_{x\_y}$ to the received gamma codes $g_{x\_y}$; that is, $$g_{x\_y\_out}=g_{x\_y}+\Delta g_{x\_y}, x=1\sim w \text{ and } y=1\sim h;$$

wherein x is the horizontal coordinate and y is the vertical coordinate, and w is the maximum horizontal coordinate value and h is the maximum vertical coordinate value.

In this embodiment, the gamma codes of the center area or pixel may be considered as a reference (i.e., golden) to determine the calibration difference values. The compensation calibration circuit 1310 may be configured to calculate the calibration difference values corresponding to the center area. As for the center area or pixel, the settings SET1 and SET2 have the gamma compensation values $\Delta g_{center}$ and $\Delta g_{center}'$, respectively, which is used to obtain the calibration difference values $\text{diff}_{GL\_center}$ as:

$$\text{diff}_{GL\_center}=g_{center}-\Delta g_{center}'.$$

The calibration difference value $\text{diff}_{GL\_center}$ may also refer to the difference between the output gamma code of the original setting SET1 and the output gamma code of the new setting SET2 on the center area or pixel corresponding to certain specific grayscale value(s). The calibration difference values $\text{diff}_{GL\_center}$ corresponding to various grayscale values may be calculated and then stored in an LUT.

The calibration difference values $\text{diff}_{GL\_center}$ generated based on the center area or pixel may further be considered as a reference (i.e., golden) for generating the output gamma codes $g_{x\_y\_out}$ for other pixels. Similarly, the implementation of using the center area or pixel as the reference is merely an example, and the calibration difference values may be calculated by using the gamma codes at any appropriate pixel position as the reference.

As shown in FIG. 13, when the setting of the display panel 1360 needs to be modified, or if the pixel compensation result of gamma tuning is not satisfactory due to any reason, the compensation calibration circuit 1310 may be used to calibrate the output gamma codes $g_{x\_y\_out}$ by using the calibration difference values $\text{diff}_{GL\_x\_y}$ (which may be calculated in advance and stored in the LUT), so as to generate the correct output gamma codes at each position. Note that the calibration difference values $\text{diff}_{GL\_center}$ may include a set of values for various grayscale data (e.g., from $D_0$ to $D_{255}$), and the calibration difference value $\text{diff}_{GL\_x\_y}$ for each pixel may be identical or different according to the values of image data in each pixel.

Figure 14:
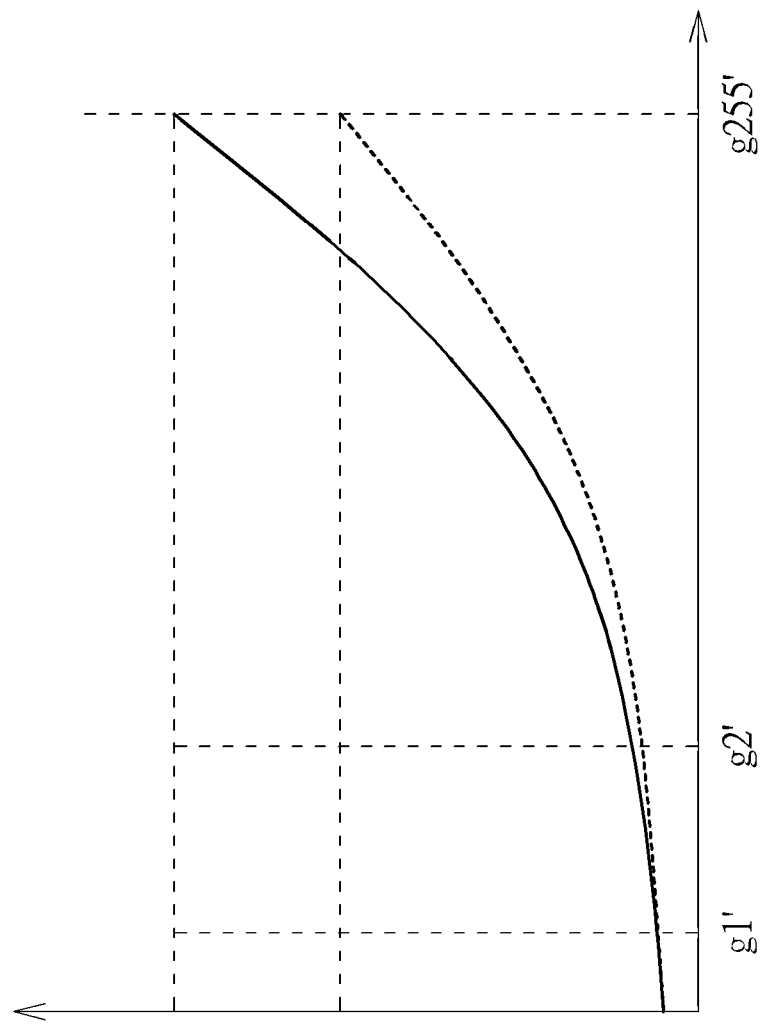
FIG. 14 and FIG. 15 illustrate failure examples where the gamma curves have wrong values when the setting changes.

FIG. 14 illustrates a failure example, where the gamma curves GC1 and GC2 corresponding to the settings SET1 and SET2 are shown. Supposing that the gamma tuning and IR-drop compensation are performed based on the setting SET1, if the display system needs to change to the setting SET2, the gamma curve may be decreased, resulting in wrong brightness under the present gamma compensation values.

Figure 15:
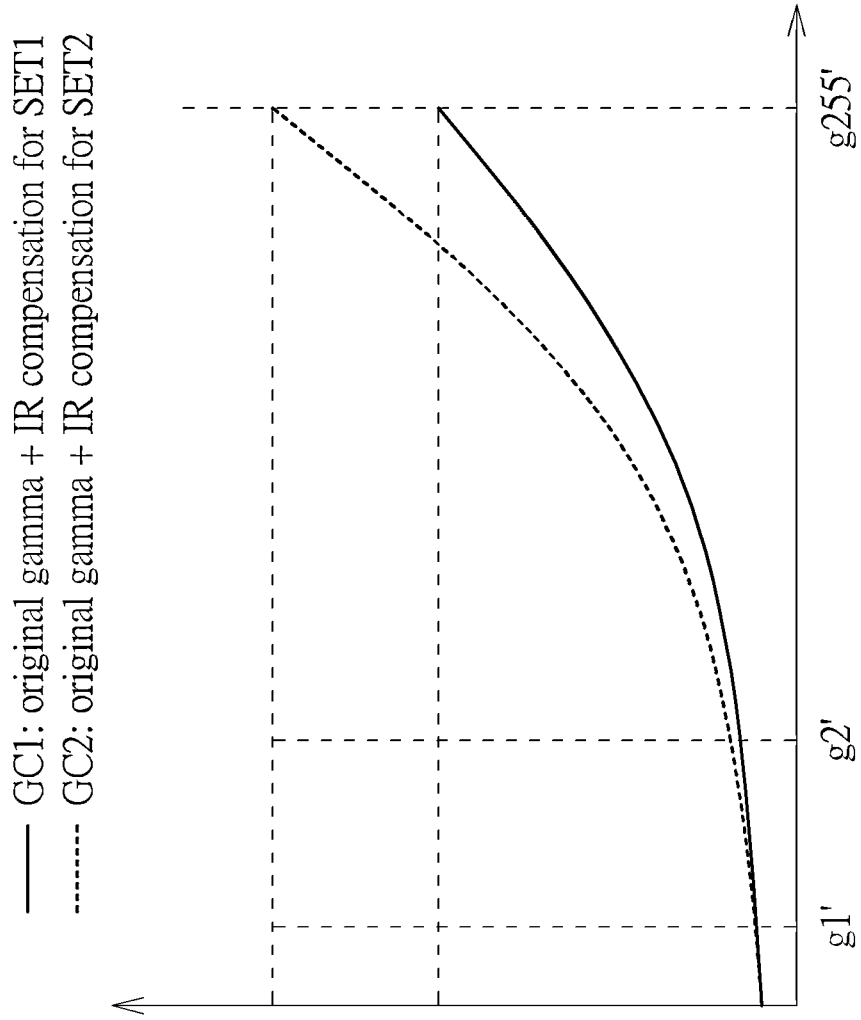

FIG. 15 illustrates a similar failure example, where the gamma curve after the display setting changing to SET2 may be increased to generate wrong brightness under the present gamma compensation values.

Figure 16:
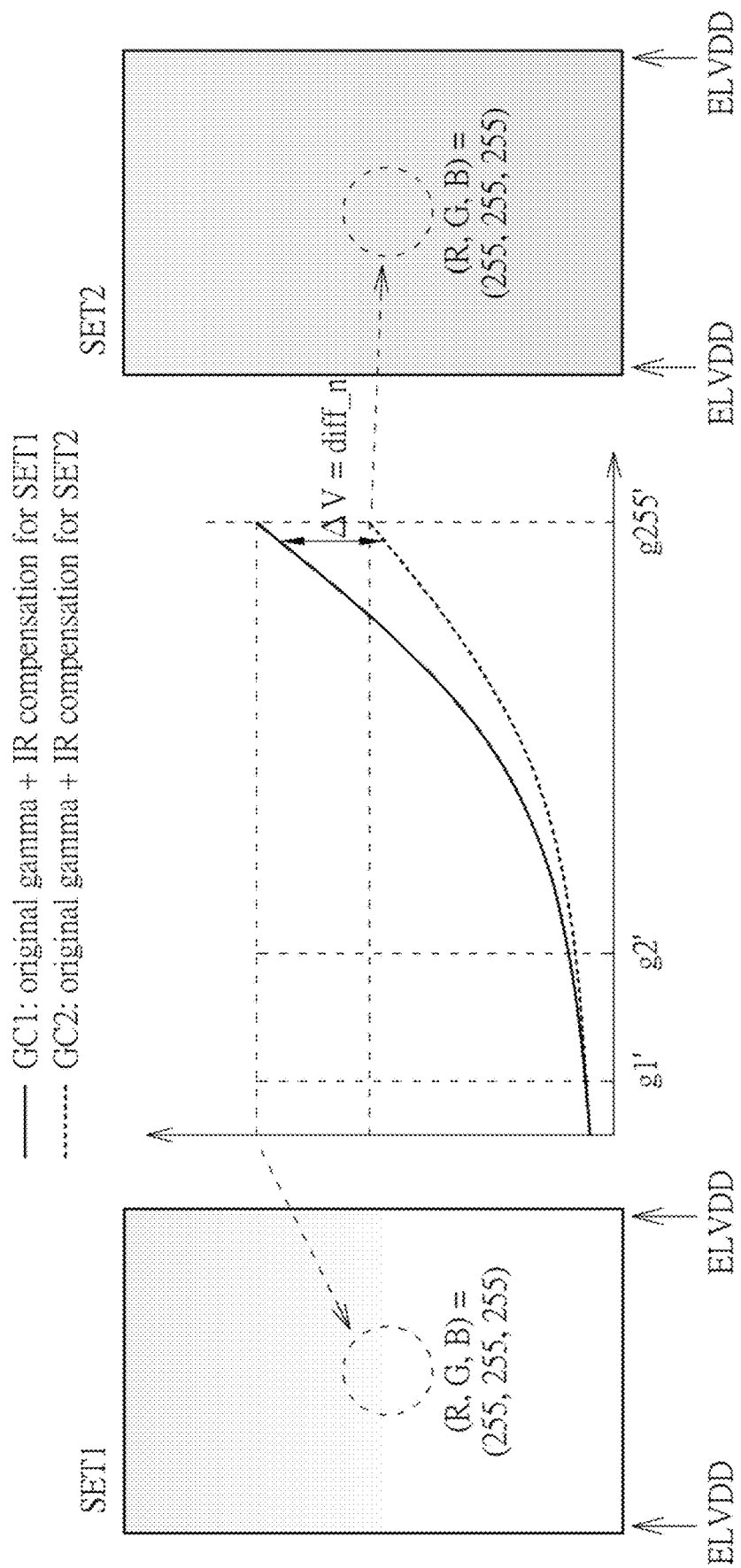
FIG. 16 and FIG. 17 illustrate that the calibration difference values are incorporated in the output gamma codes to correct the gamma curve.
Figure 17:
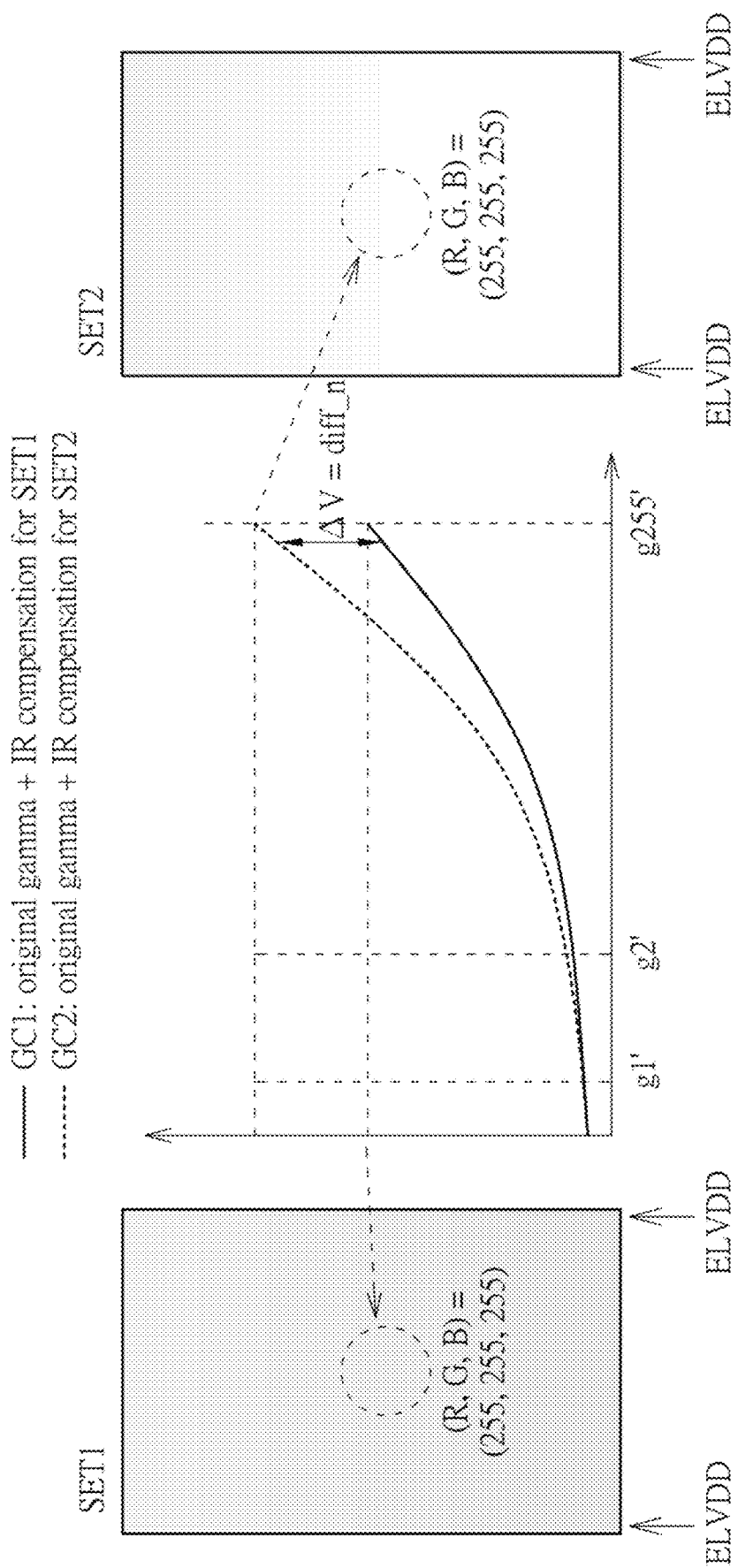

In order to correct the gamma curve, the compensation calibration circuit 1310 may incorporate the calibration difference values diff_n (n=0~255) in the output gamma codes (which correspond to the gamma voltages in the gamma curve), as shown in FIGS. 16 and 17. In these embodiments, the calibration is performed by using the calibration difference values generated based on the gamma codes on the center pixel, which are supposed to have a grayscale data 255. In FIG. 16, the calibration difference values diff_n are applied to increase the luminance to accurate values as in the original setting SET1. In FIG. 17, the calibration difference values diff_n are applied to decrease the luminance to accurate values as in the original setting SET1.

Embodiment 3

In Embodiment 3, a compensation mode generator is provided for generating the gain and offset values for calculating the gamma compensation values in various operation modes or settings. That is, the gamma compensation values for various operation modes having different IR-drop compensation magnitudes, optical settings, voltage settings, and/or timing settings may be calculated and generated based on a specific set of gamma compensation values for a selected operation mode, so that the tuning of gamma compensation values only needs to be performed by one time (i.e., only for the selected mode).

Figure 18:
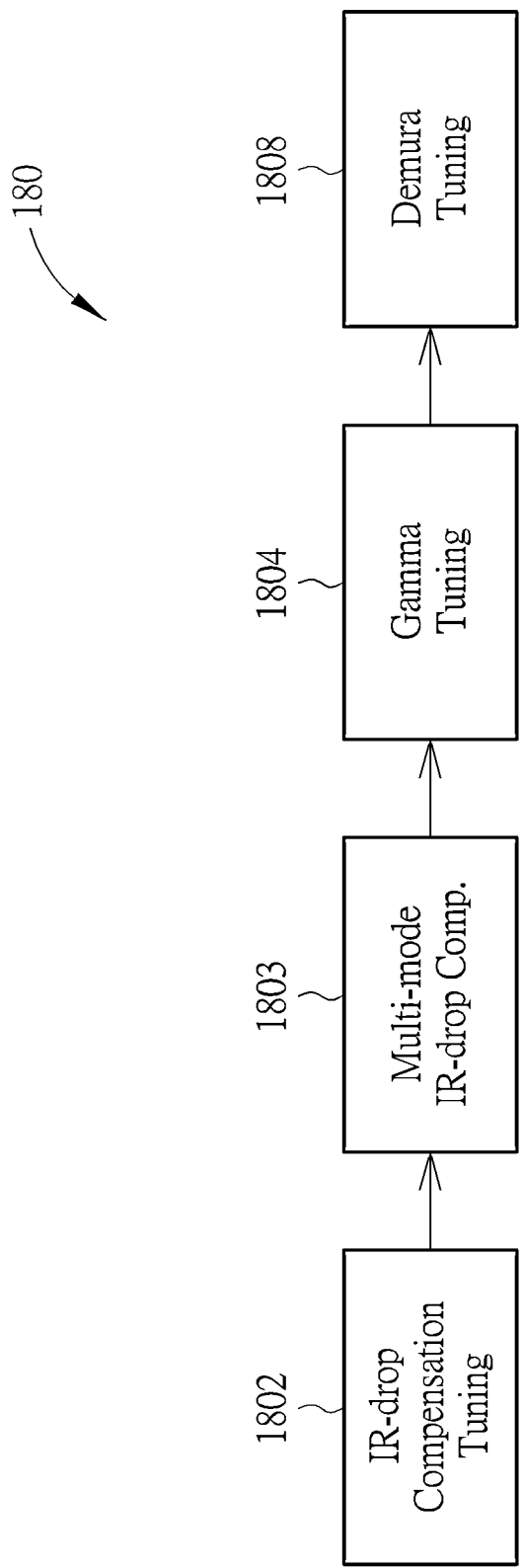
FIG. 18 is a flowchart of an image compensation process according to an embodiment of the present invention.

FIG. 18 is a flowchart of an image compensation process 180 according to an embodiment of the present invention. The image compensation process 180 includes steps of IR-drop compensation tuning 1802, multi-mode IR-drop compensation 1803, gamma tuning 1804 and demura tuning 1808. The operations of the IR-drop compensation tuning 1802, the gamma tuning 1804 and the demura tuning 1808 are similar to those of the IR-drop compensation tuning 202, the gamma tuning 204 and the demura tuning 208 shown in FIG. 2. The difference between the image compensation process 180 and the image compensation process 20 is that, the image compensation process 180 further includes the multi-mode IR-drop compensation 1803, which is performed to calculate the gamma compensation values for various operation modes. As mentioned above, the gamma compensation values for various operation modes should be generated for gamma tuning. Therefore, the gamma compensation values may be generated before the gamma tuning and IR-drop compensation. According to Embodiment 3, after the gamma compensation values of a specific operation mode are generated, the gamma compensation values of other operation modes may be generated by modifying the gamma compensation values of the specific operation mode.

Figure 19:
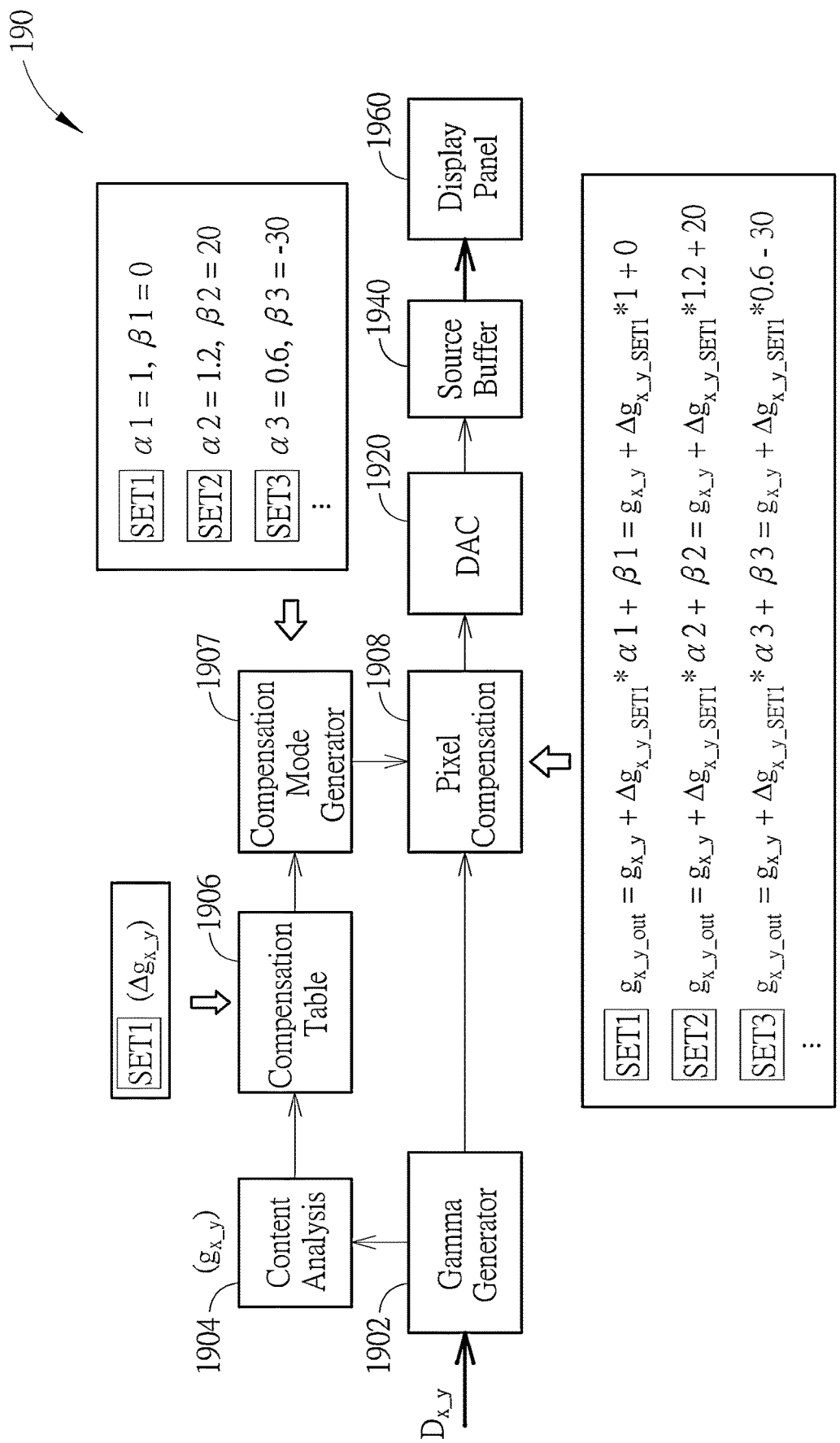
FIG. 19 is a schematic diagram of a display driver circuit according to an embodiment of the present invention.

FIG. 19 is a schematic diagram of a display driver circuit 190 according to an embodiment of the present invention, which illustrates the circuit structure for generating the gamma compensation values corresponding to multiple operation modes. The display driver circuit 190 includes an image compensation circuit 1900, a DAC 1920 and a source buffer 1940. The source buffer 1940 may output gamma voltages as driving voltages to a display panel 1960, which is also shown in FIG. 19 to facilitate the illustrations. The DAC 1920 is configured to convert the gamma codes into the gamma voltages.

The image compensation circuit 1900, which is used to compensate for the IR-drop of the display panel 1960, may be integrated in a source driver or a control IC for the display panel 1960. The image compensation circuit 1900 includes a gamma generator 1902, a content analysis circuit 1904, a compensation table 1906, a compensation mode generator 1907 and a pixel compensation circuit 1908. The gamma generator 1902 may receive a series of image data such as a frame of image data $D_{x\_y}$, where x and y are positive integers representing the coordinate of pixels on the display panel 1960. In an embodiment, the image data $D_{x\_y}$ may be grayscale data.

In this embodiment, there are three settings SET1-SET3 which may correspond to different operation modes. The setting SET1 is configured as a reference for calculating the gamma compensation values for other settings SET2 and SET3. In detail, the compensation mode generator 1907 may obtain the gamma compensation values corresponding to the settings SET1-SET3. Based on the setting SET1, the gamma compensation values of each of the other settings SET2 and SET3 may be associated with the gamma compensation values of the setting SET1 with at least one parameter, such as a gain and an offset.

Therefore, based on the gamma compensation values $\Delta g_{x\_y\_SET1}$ for the setting SET1, the compensation mode generator 1907 may calculate the gain and offset for generating the gamma compensation values for the settings SET2 and SET3. More specifically, based on the gamma compensation values $\Delta g_{x\_y\_SET1}$ for the setting SET1, a gain α2 and an offset β2 may be used to calculate the gamma compensation values $\Delta g_{x\_y\_SET2}$ for the setting SET2 as follows:

$$\Delta g_{x\_y\_SET2} = \Delta g_{x\_y\_SET1} \times \alpha 2 + \beta 2$$

Similarly, a gain α3 and an offset β3 may be used to calculate the gamma compensation values $\Delta g_{x\_y\_SET3}$ for the setting SET3 as follows:

$$\Delta g_{x\_y\_SET3} = g_{x\_y\_SET1} \times \alpha 3 + \beta 3.$$

In such a situation, the LUT only needs to store the information of gains and offsets instead of the overall gamma compensation values, and the data quantities may be significantly reduced. The gamma compensation values $\Delta g_{x\_y\_SET2}$ or $\Delta g_{x\_y\_SET3}$ for the setting SET2 or SET3 are thereby used to generate the output gamma codes $g_{x\_y\_out}$ after gamma tuning if the setting SET2 or SET3 (and/or its related operation mode) is applied.

In detail, the gamma generator 1902 may convert the image data $D_{x\_y}$ into gamma codes $g_{x\_y}$. The content analysis circuit 1904 may analyze the image content and access the gamma compensation values $\Delta g_{x\_y\_SET1}$ from the compensation table 1906 based on the setting SET1. In addition, the compensation mode generator 1907 may obtain the corresponding gain and offset from the LUT. Therefore, the pixel compensation circuit 1908 may compensate the gamma codes by using the gamma compensation values $\Delta g_{x\_y\_SET1}$ for the setting SET1 and the related gain and offset; that is, as for the setting SET2, the output gamma codes $g_{x\_y\_out}$ equal:

$$g_{x\_y\_out} = g_{x\_y} + \Delta g_{x\_y\_SET2} = g_{x\_y} + \Delta g_{x\_y\_SET1} \times \alpha 2 + \beta 2;$$

as for the setting SET3, the output gamma codes $g_{x\_y\_out}$ equal:

$$g_{x\_y\_out} = g_{x\_y} + \Delta g_{x\_y\_SET3} = g_{x\_y} + \Delta g_{x\_y\_SET1} \times \alpha 3 + \beta 3.$$

Note that the parameters x and y are coordinates of the pixels on the display panel 1960, as similar to those described above.

As shown in FIG. 19, the gain α2 equals 1.2 and the offset β2 equals 20, and thus the output gamma codes $g_{x\_y\_out}$ for the setting SET2 equal:

$$g_{x\_y\_out} = g_{x\_y} + \Delta g_{x\_y\_SET1} \times 1.2 + 20.$$

The gain α3 equals 0.6 and the offset β3 equals −30, and thus the output gamma codes $g_{x\_y\_out}$ for the setting SET3 equal:

$$g_{x\_y\_out} = g_{x\_y} + \Delta g_{x\_y\_SET1} \times 0.6 - 30.$$

The setting SET1 is the reference used for calculating the gamma compensation values for other settings; hence, the gain α1 and the offset β3 for the setting SET1 may be considered as 1 and 0, respectively.

Therefore, according to Embodiment 3, the gamma tuning with IR-drop compensation is performed to generate the gamma compensation values for the setting SET1. The gamma compensation values of other operation modes may be obtained by calculating the gain (α) and offset (β) for each operation mode, so as to satisfy various IR-drop compensation requirements such as strong compensation or weak compensation.

In an embodiment, the gamma compensation values obtained in Embodiment 3 may further be used in Embodiment 1, to generate the gamma difference values for a selected operation mode by using the gamma compensation values corresponding to the selected operation mode. That is, the gamma difference values calculated from the gamma compensation values may be added to the gamma codes generated from gamma tuning, so as to generate the output gamma codes.

Subsequently, after the gamma tuning and IR-drop compensation are completed, if the user needs to change the operation mode or setting, or if the compensation result is not satisfactory, the compensation calibration circuit may use calibration difference values to calibrate the gamma codes, as described in Embodiment 2. In fact, each of Embodiments 1-3 may facilitate the reduction of time and efforts by avoiding repeated and redundant gamma tuning processes, and any one or more of Embodiments 1-3 may be performed collaboratively to realize the IR-drop compensation process.

Please note that the present invention aims at providing a novel image compensation circuit capable of IR-drop compensation. Those skilled in the art may make modifications and alterations accordingly. For example, in the above embodiments, the gamma compensation values, gamma difference values, and/or related parameters are stored in the LUT. The LUT may be a table stored in a memory included in the image compensation circuit such as the compensation table as shown in FIG. 6, 13 or 19. Alternatively, the LUT may be stored in an external memory coupled to the image compensation circuit. In addition, the difference values incorporated in the gamma codes may be treated as an addition to or a deduction from the original gamma codes, and the calculation method does not limit the scope of the present invention.

To sum up, the present invention provides a method of compensating for IR-drop and a related image compensation circuit, which are applicable to realize multiple operation modes and different settings by using simple calculation without redundant gamma tuning and IR-drop tuning operations. In an embodiment, the gamma compensation values for one operation mode or setting may be used to calculate the gamma compensation values for other operation modes or settings. In an embodiment, the gamma tuning is performed based on a specific operation mode such as a first operation mode, and a set of gamma compensation values for the first operation mode are incorporated to perform IR-drop compensation and generate the gamma codes. The set of gamma compensation values for the first operation mode may be considered as a reference to calculate a set of gamma difference values used for calculating the gamma compensation values for another operation mode. For example, when the display panel needs to operate in a second operation mode, the set of gamma difference values for realizing the second operation mode may be incorporated to generate the output gamma codes. Further, in an embodiment, after the gamma tuning and the IR-drop compensation are completed, if the user needs to change the operation mode/setting or if the compensation result is not satisfactory, the calibration difference values may be used to calibrate the gamma codes, so that redundant gamma tuning procedure may be avoided.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image compensation circuit for controlling a luminance of a display panel, the image compensation circuit being configured to:
   receive a plurality of image data;
   perform gamma tuning to convert the plurality of image data into a plurality of original gamma codes according to a plurality of first compensation values corresponding to a first operation mode;
   calculate a plurality of gamma difference values between the plurality of first compensation values and a plurality of second compensation values corresponding to a second operation mode; and
   calculate a plurality of output gamma codes corresponding to the second operation mode according to the plurality of original gamma codes by using the plurality of gamma difference values.

2. The image compensation circuit of claim 1, wherein the plurality of gamma difference values are stored in a look-up table (LUT).

3. The image compensation circuit of claim 1, wherein the plurality of gamma difference values are calculated when the image compensation circuit is configured to operate in the second operation mode.

4. The image compensation circuit of claim 1, wherein each of the plurality of gamma difference values corresponds to one of a plurality of data values of the plurality of image data and one of a plurality of operation modes.

5. The image compensation circuit of claim 1, wherein the plurality of first compensation values are used to compensate for a voltage drop on the display panel in the first operation mode, and the plurality of second compensation values are used to compensate for the voltage drop on the display panel in the second operation mode.

6. The image compensation circuit of claim 1, wherein each of the plurality of gamma difference values is a difference of a first compensation value among the plurality of first compensation values and a second compensation value among the plurality of second compensation values corresponding to the same pixel.

7. An image compensation circuit for controlling a luminance of a display panel, the image compensation circuit being configured to:
   receive a plurality of image data;
   perform gamma tuning to convert the plurality of image data into a plurality of gamma codes according to a plurality of compensation values; and
   calibrate the plurality of gamma codes after the plurality of gamma codes are generated in the gamma tuning.

8. The image compensation circuit of claim 7, wherein the plurality of gamma codes are calibrated when a setting of the image compensation circuit is modified.

9. The image compensation circuit of claim 7, wherein the plurality of gamma codes are calibrated when a value of the plurality of gamma codes fails to meet a requirement.

10. The image compensation circuit of claim 7, wherein the plurality of compensation values are used to compensate for a voltage drop on the display panel.

11. The image compensation circuit of claim 7, further being configured to apply a calibration difference value to calibrate the plurality of gamma codes.

12. The image compensation circuit of claim 11, wherein the calibration difference value is stored in a look-up table (LUT).

13. An image compensation circuit for controlling a luminance of a display panel, the image compensation circuit being configured to:

receive a plurality of image data;

calculate a plurality of first compensation values corresponding to a first setting; and calculate at least one parameter for generating a plurality of second compensation values corresponding to a second setting according to the plurality of first compensation values.

14. The image compensation circuit of claim 13, further being configured to perform gamma tuning to convert the plurality of image data into a plurality of gamma codes according to the plurality of second compensation values generated by using the at least one parameter when the second setting is applied in the image compensation circuit.

15. The image compensation circuit of claim 13, wherein the at least one parameter comprises at least one of a gain and an offset.

16. The image compensation circuit of claim 13, wherein the plurality of first compensation values are used to compensate for a voltage drop on the display panel in the first setting, and the plurality of second compensation values are used to compensate for the voltage drop on the display panel in the second setting.

17. The image compensation circuit of claim 13, wherein the at least one parameter is calculated before gamma tuning is performed.

* * * * *